US008036792B2

United States Patent
Dechamp

(10) Patent No.: US 8,036,792 B2
(45) Date of Patent: Oct. 11, 2011

(54) METHOD FOR DETERMINING A SET STEERING ANGLE OF STEERED WHEELS OF A VEHICLE

(75) Inventor: Francois Dechamp, Cluny (FR)

(73) Assignee: Renault Trucks, Saint Priest (FR)

( * ) Notice: Subject to any disclaimer, the term of this patent is extended or adjusted under 35 U.S.C. 154(b) by 667 days.

(21) Appl. No.: 11/993,359

(22) PCT Filed: Jun. 24, 2005

(86) PCT No.: PCT/FR2005/050492
§ 371 (c)(1),
(2), (4) Date: Aug. 1, 2008

(87) PCT Pub. No.: WO2007/000502
PCT Pub. Date: Jan. 4, 2007

(65) Prior Publication Data
US 2009/0306854 A1    Dec. 10, 2009

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)

(52) U.S. Cl. .......... 701/41; 180/235; 340/431; 280/426; 280/442

(58) Field of Classification Search .............. 701/41; 180/445, 235, 411; 340/431; 280/426, 442, 280/446.1, 448, 479.1
See application file for complete search history.

(56) References Cited

U.S. PATENT DOCUMENTS

| 3,605,088 | A | 9/1971 | Savelli |
| 5,247,442 | A | 9/1993 | Kendall et al. |
| 6,223,114 | B1 * | 4/2001 | Boros et al. ...................... 701/70 |
| 6,273,446 | B1 * | 8/2001 | Paul ................................ 280/448 |
| 6,292,094 | B1 * | 9/2001 | Deng et al. ..................... 340/431 |
| 6,366,221 | B1 | 4/2002 | Lisaka et al. |
| 6,494,476 | B2 * | 12/2002 | Masters et al. ................ 280/426 |

(Continued)

FOREIGN PATENT DOCUMENTS

DE    19806655 A1    8/1999

(Continued)

Primary Examiner — Khoi Tran
Assistant Examiner — Jamie Figueroa
(74) Attorney, Agent, or Firm — Novak Druce + Quigg LLP

(57) ABSTRACT

The invention relates to a method for determining a set steering angle $\beta_o$ of steered wheels of a vehicle comprising a tractor and a trailer that is articulated with regard to the tractor. This method makes it possible to produce a set value that can be used for various purposes. This set value can thus be used for controlling an actuator acting upon the steering angle or for being communicated in order to inform the driver. According to the invention, during reversing maneuvers: based on a target point C via which the driver would like the path of the vehicle to pass, an angle set value $?_c$ between the axes of the trailer and of the tractor is determined according to said target point C and to the dimensions of the vehicle, and; the set steering angle $\beta$ of the steered wheels is determined according to a servo-system causing the measured angle $?$ between the axis of the trailer and the tractor to tend toward said angle set value $?_c$.

10 Claims, 5 Drawing Sheets

U.S. PATENT DOCUMENTS

| | | |
|---|---|---|
| 6,564,122 B1 | 5/2003 | Huertgen et al. |
| 6,854,557 B1 | 2/2005 | Deng et al. |
| 2001/0018630 A1* | 8/2001 | Wetzel et al. .................. 701/70 |
| 2002/0069006 A1* | 6/2002 | Faye et al. ...................... 701/70 |
| 2002/0180178 A1* | 12/2002 | Masters et al. ................ 280/426 |
| 2004/0080209 A1* | 4/2004 | Leimbach et al. ............ 303/146 |
| 2005/0000738 A1* | 1/2005 | Gehring et al. ............. 180/14.1 |
| 2007/0051547 A1* | 3/2007 | Fischer et al. ................ 180/204 |

FOREIGN PATENT DOCUMENTS

| | | |
|---|---|---|
| DE | 10142367 A1 | 3/2003 |
| WO | 9621582 A1 | 7/1996 |
| WO | 2004022413 A1 | 3/2004 |

* cited by examiner

METHOD FOR DETERMINING A SET STEERING ANGLE OF STEERED WHEELS OF A VEHICLE

TECHNICAL FIELD

The invention relates to a method related to the control of the steering of a vehicle, particularly an industrial vehicle of the truck type. It relates more specifically to coupled vehicles comprising an articulation between a tractor and a trailer. This may therefore be a vehicle of the semitrailer type in which the semitrailer is articulated to a tractor at a fifth wheel. This may also be a coupling involving a truck of the type that carries a payload, behind which a trailer is articulated.

The invention therefore more specifically relates to a method of determining a steering setpoint angle for the steered wheels, intended to facilitate the work of the driver during backing-up maneuvers. The problem is that, given the articulation between the tractor and the trailer, backing-up maneuvers that are not in a straight line require operations of applying steering lock and opposite lock to be strung together in an appropriate sequence.

PRIOR ART

As already mentioned, backing-up maneuvers, for example when coming up alongside a platform or parking, require a certain amount of skill on the part of the driver given the articulation between the two parts of the vehicle. This skill is all the more necessary given that the direct field of view is relatively limited, if not non-existent because the rear view mirrors are mounted on the tractor vehicle and are unable to provide a view of the space behind the trailer when this trailer is not perfectly aligned with the tractor.

To make backing-up maneuvers easier in various vehicles there are solutions that have already been proposed and that employ an image acquisition device situated at the rear of the vehicle and providing a view of the space behind the trailer. Systems such as these have been described in particular in documents DE 101 42 367, U.S. Pat. No. 6,366,221 and U.S. Pat. No. 6,564,122.

In document WO 2004/022413 the applicant has described a device making it possible, on the one hand, to display the rear field of view of the vehicle in direct mode, without inverting images in the way that a mirror would and, on the other hand, to reverse the direction in which the wheels are turned under the action of the movement of the steering wheel.

All these systems make it easier to back up insofar as the driver is, in virtual terms, positioned behind the vehicle. They are well suited to vehicles of the type that carry a payload. By contrast, in the case of articulated vehicles, there is still the need for the driver to string together the operations of applying steering lock and opposite lock appropriately in order to perform the backing-up maneuver.

Elsewhere, document U.S. Pat. No. 3,605,088 describes a device installed in the cab of a coupled vehicle. This device is interfaced with linkage mechanisms making it possible to detect situations in which the coupling is in extreme angular positions relative to the tractor. In this case, the driver is informed through a luminous display of the need to apply steering lock or opposite lock. A device such as this prevents the tractor from striking the coupling in a configuration known as "jack-knifing". In other words, this device does not provide assistance for the whole of the backing-up maneuver but merely generates alerts in extreme angular situations.

Another device for preventing jack-knifing is described in document U.S. Pat. No. 6,292,094.

To make backing-up maneuvers easier it is also known, from document WO 96/21582, for the driver to be informed of the distance separating the rear of his vehicle from the various obstacles there are. A similar device has been described in document U.S. Pat. No. 6,564,122 in which an in-cab display detects whether the current path being followed carries a risk of meeting with an obstacle located behind the vehicle.

All of these devices provide the driver with a certain amount of assistance, but the driver nonetheless still has to decide when to apply steering lock and opposite lock in order to achieve the desired backing-up maneuver.

Furthermore, the driver's points of reference may change from one truck to another according to the wheelbase of the tractor, the location of the point of articulation, and the length of the trailer. It will therefore be appreciated that there is indeed some benefit to be derived in affording the driver assistance throughout the backing-up maneuver, and to do so according to characteristics specific to the vehicle.

SUMMARY OF THE INVENTION

It is an objective of the invention to make backing-up maneuvers in articulated vehicles easier. The invention therefore relates more specifically to a method of determining a setpoint angle value for the steering angle of the steered wheels of a coupled vehicle comprising a tractor and a trailer that is articulated with respect to the tractor. This method makes it possible to formulate setpoints that can be applied to an actuator that influences the steering angle in a vehicle of the "steer by wire" type or alternatively that can be displayed on a driver aid screen available to the driver on a vehicle with conventional steering.

According to the invention, during the backing-up maneuvers:
  a setpoint angle value is determined for the angle between the axis of the trailer and the axis of the tractor using a target point through which the path of the vehicle is to pass and as a function of the location of the target point and of the geometry of the vehicle;
  the steering angle setpoint value for the steered wheels is determined as the result of feedback control that causes the measured angle between the axis of the trailer and of the tractor to tend toward said setpoint value previously calculated.

In other words, the invention consists in contriving for a steering angle setpoint to be formulated automatically during backing-up maneuvers so that the vehicle can be brought to a point predetermined by the driver. This steering angle setpoint value is calculated in such a way as to bring the coupling into a configuration that allows the aim point to be reached. The phases of applying steering lock and opposite lock can therefore be strung together in the optimum way so that the aim point is reached at the end of the maneuver.

Advantageously in practice, at the time that it is selected, the selected target point may lie a predetermined distance behind the trailer. In other words, the target point can be detected by its coordinates in a frame of reference associated with the trailer, and one axis of which frame of reference corresponds to the longitudinal axis of the trailer. In such a case, the target point has one coordinate fixed in this frame of reference and can deviate laterally from the axis of the trailer.

The determination of the steering angle setpoint value may take account of several components which advantageously can be combined.

Thus, a first component for control of the steering angle is a function of the radius of curvature of the path of the point at which the trailer is articulated to the tractor. This radius of curvature is determined with respect to the geometry of the vehicle and, in particular, with respect to the position of the fixed rear axle of the trailer and the position of the aim point.

The steering angle setpoint value may incorporate a second component which can be obtained as a function, particularly using proportional and/or integral and/or derivative processing, of the difference between the actual angle measured between the axes of the tractor and of the trailer and the optimum setpoint angle for the coupling.

In practice, the steering angle setpoint value for the wheels may include an additional component which is taken into consideration when the angle between the axes of the tractor and of the trailer crosses a predetermined threshold in order to reduce this angle. It is in fact important for the steering control not to lead to a situation in which the angle between the trailer and the tractor would cause the coupling to jack-knife.

BRIEF DESCRIPTION OF THE DRAWINGS

The embodiment of the invention and the ensuing advantages will become clearly apparent from the description of the embodiment which follows, with the support of the attached figures in which.

EMBODIMENT OF THE INVENTION

Figure 1:
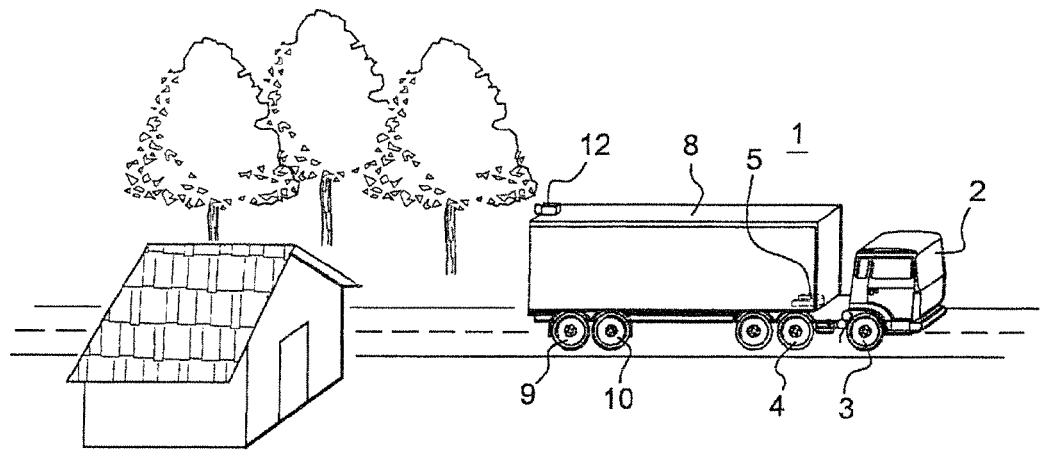
FIG. 1 is a brief perspective view of a truck moving around in an environment in which the invention can be implemented.

As already mentioned, the invention relates to an advantageous method for controlling the steering angle of the steered wheels of an articulated vehicle, as illustrated in FIG. 1. A vehicle 1 such as this therefore comprises a tractor 2 comprising two axles 3, 4 and a fifth wheel 5 to which the point of attachment of a trailer 8 is articulated. This trailer 8 at the rear comprises two axles 9, 10 and an image acquisition device 12 depicted schematically on the upper wall of the trailer 8.

Figure 2:
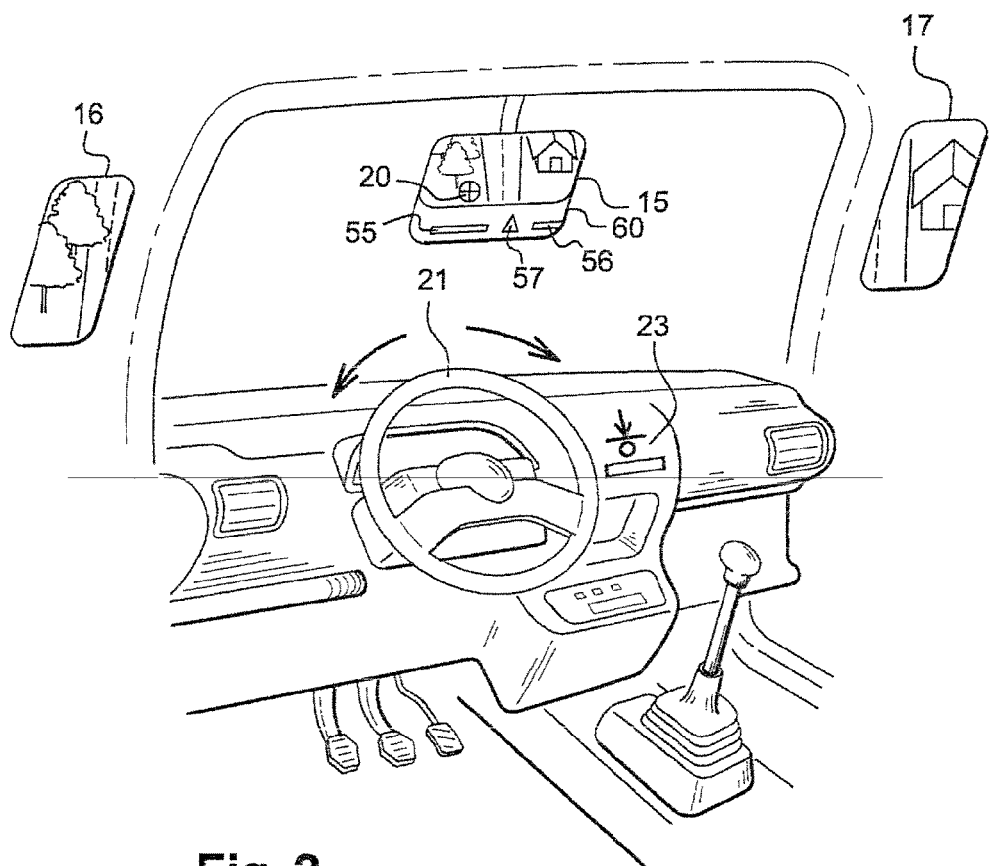
FIG. 2 is a brief perspective view of the interior of a cab of a vehicle implementing the method according to the invention.

As illustrated in FIG. 2, this image acquisition device 12 allows the rear field of view of the vehicle to be displayed on a screen 15. In FIG. 2, this screen 15 is positioned in the middle at the top of the windshield, but it goes without saying that it could be positioned at some other location, without departing from the scope of the invention.

Thus, in combination with the two, left and right, rear-view mirrors 16, 17, the driver has available to him various complementing fields of view which do not necessarily overlap if the trailer and the tractor are not aligned.

Figure 5:
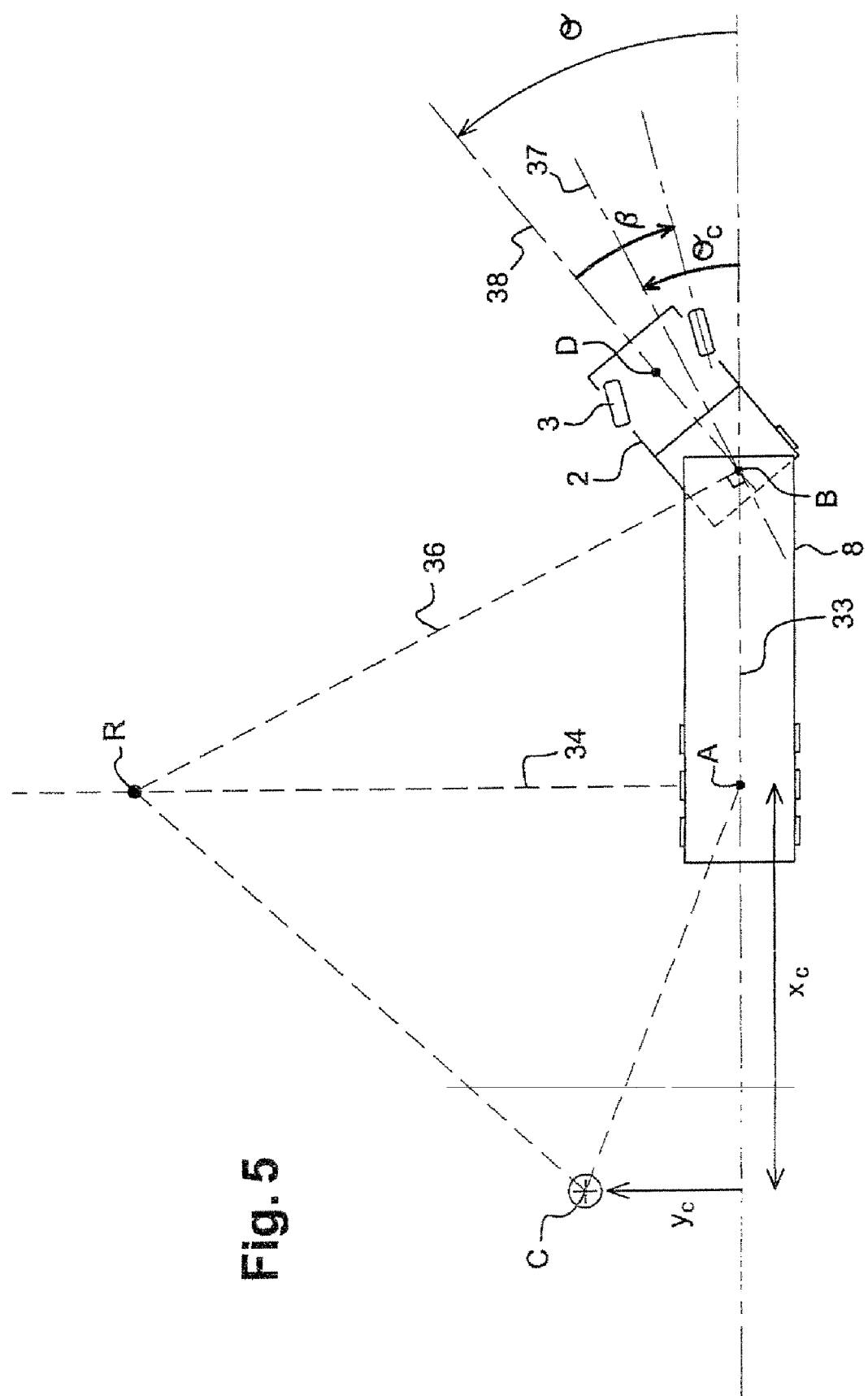
FIG. 5 is a schematic plan view of a truck depicting the various angles and distances used in implementing the invention.

The method according to the invention entails the selection of a target point C, visible in FIG. 5, through which the path of the vehicle is to pass. This selection can be made in different ways, according to the type of steering system used. Thus, in electronic steering systems known as "steer by wire" systems, the target point may be selected by turning the steering wheel 21 so as to display, as illustrated in FIG. 2, the position of a sighting mark 20 on the display screen. The target point may equally be selected using a mechanism independent of the steering wheel, particularly on vehicles with conventional steering, employing steering column and steering rack. Selection may thus, for example, be made by manipulating a knob or some other aiming device. It is equally possible to select the target point by choosing a prerecorded maneuver that corresponds to situations habitually and repeatedly encountered.

Figure 3:
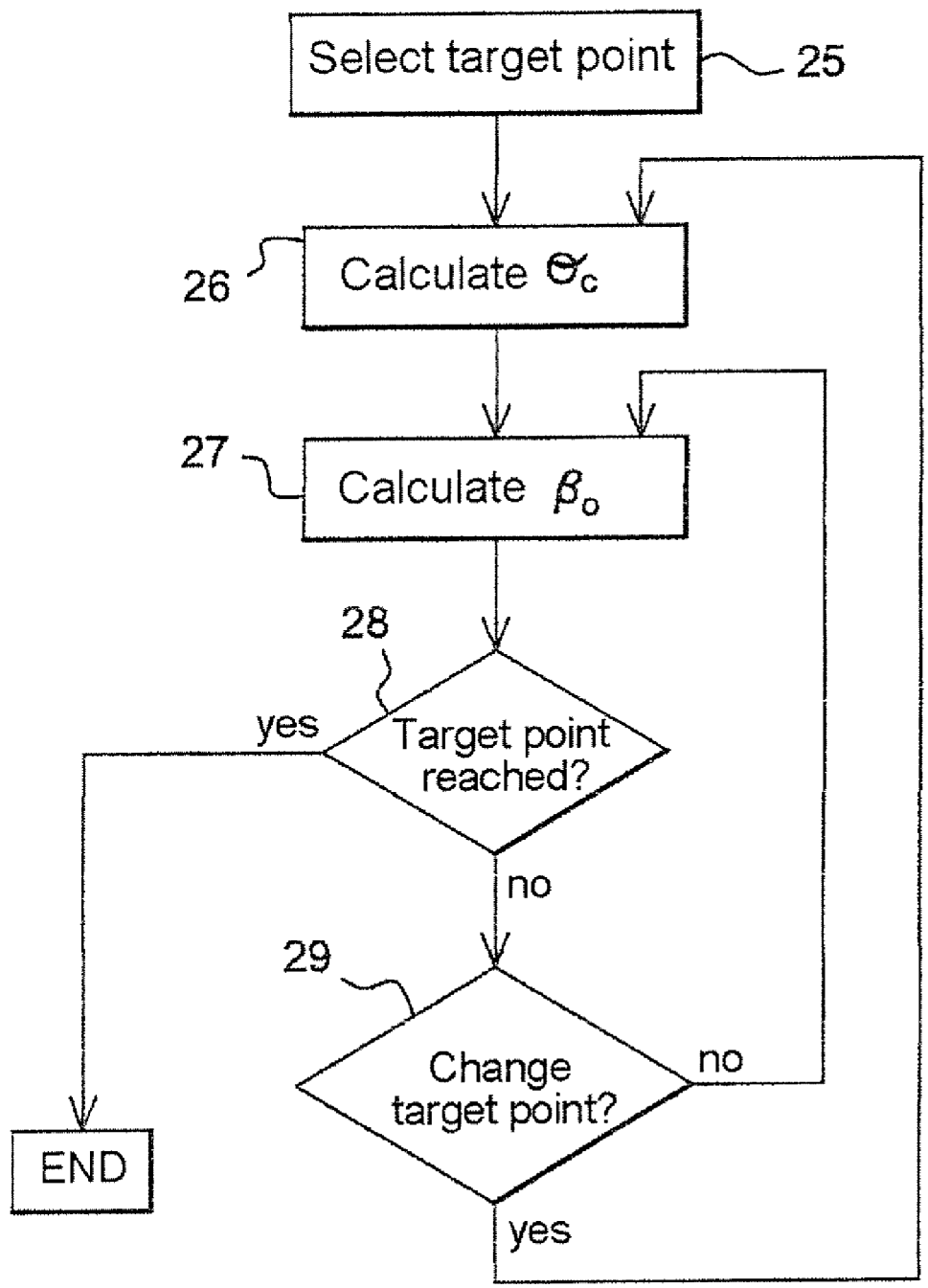
FIG. 3 is a flow diagram schematically showing how the steps of the invention are strung together.

As illustrated in FIG. 3, the method according to the invention therefore involves a first step 25 during which the driver selects the target point through which the path of the vehicle is to pass. Next, once this selection has been made, the method continues with a step 26 of calculating the angle $\theta_c$ corresponding to the ideal angle that the axis of the tractor needs to adopt with respect to the axis of the trailer. This first calculation, in a step 27, leads to calculation of the steering angle setpoint value $\beta_0$ which is then variously used according to the type of steering system. This setpoint value may be displayed for the attention of the driver or used by an autonomous steering control system. The method continues as long as the target point is not reached, the check on this being performed in step 28.

If the driver does not alter the target point, according to the test at 29, then the method continues, without a break, with calculation 27 of the steering angle setpoint value $\beta_0$. What actually happens is that because of the dynamics of the vehicle, the steering maneuvers will mechanically cause the angle $\theta$ of the articulation between the tractor and the trailer to change, and this factor is fed into the calculation of the steering angle setpoint value $\beta_0$ in the way explained hereinafter.

By contrast, if the driver does change his selection of target point, then a new calculation 26 of the angle $\theta_c$ is performed and the method continues with a new calculation of the steering angle setpoint value $\beta_0$ in step 27.

Figure 4:
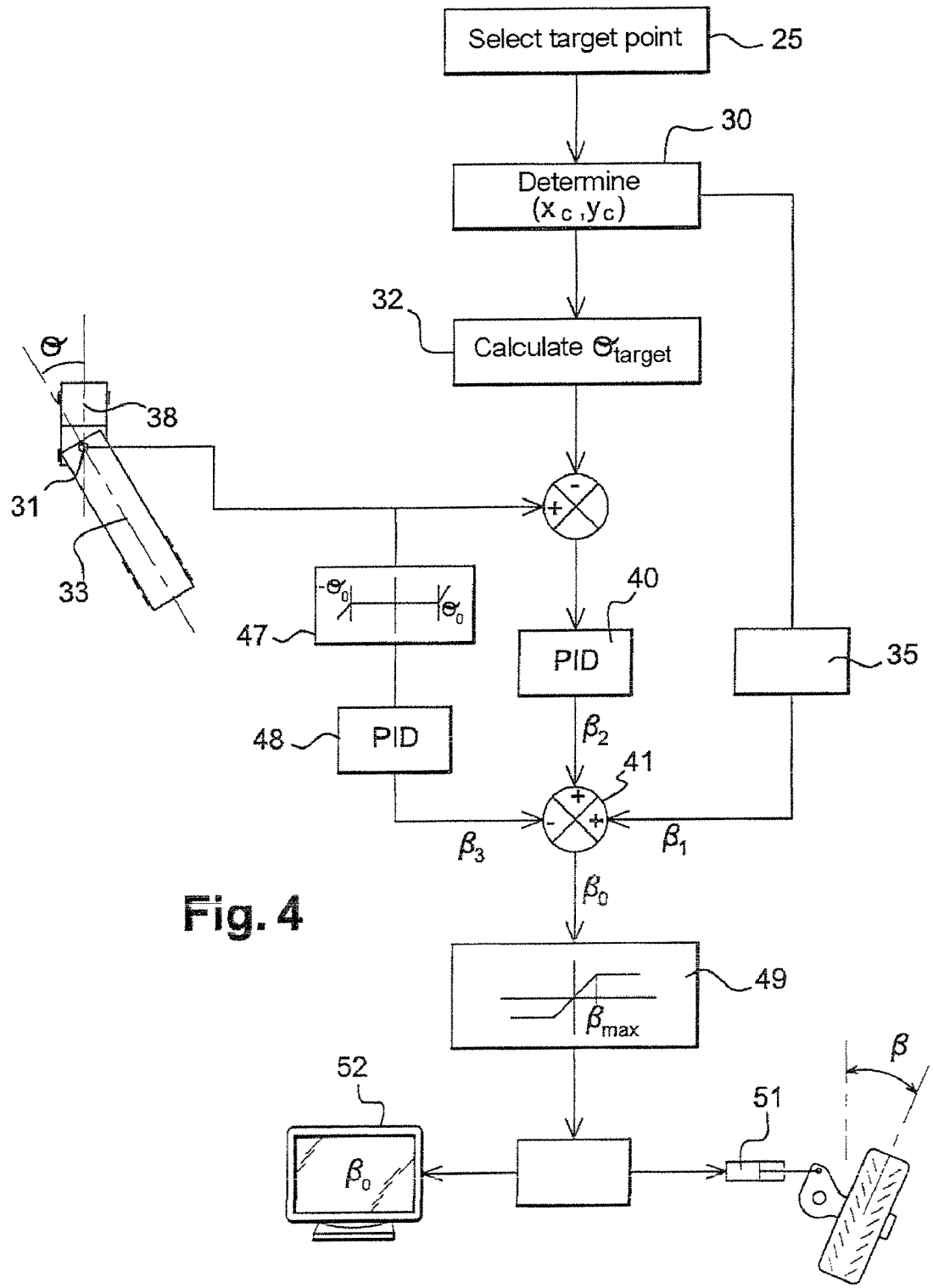
FIG. 4 is a simplified diagram showing how the various steps of the invention work.

The way in which the method is run is shown in detail in FIG. 4 in combination with FIG. 5 which depicts the various points and axes useful in implementing the method. Thus, once the position of the target point C visible in FIG. 5 has been selected during step 25, the method according to the invention is initiated by determining at 30 target aim point C. This determining consists in converting the position of the sighting mark 20 present on the screen 15 into target point coordinates. This determining is done by calculating the coordinates $x_c$, $y_c$ of this point C in a frame of reference based on the point A, situated in vertical alignment with the fixed rear axle of the trailer. When the trailer has several fixed rear axles, this point A is situated midway between the axles. The characteristic frame of reference is therefore formed by the axis 33 of the trailer and a perpendicular axis 34 passing through the point A.

It is assumed at the time of selection that the target point C lies at a coordinate $x_c$ along the axis 33 that adopts a predetermined value which can range up to about a few tens of meters. The target point can deviate laterally from the axis 33 of the trailer. The position of the sighting mark 20 on the screen therefore corresponds to a lateral deviation of the sighting mark with respect to the axis 33 of the trailer, which deviation is converted into the coordinate $y_c$ along the axis 34 of the frame of reference. This being the case, moving the sighting mark 20 in just a horizontal direction is enough to determine the position of the target point C.

Thus, it is possible to calculate the position of the ideal center of rotation R situated at equal distances from the aim point C and from the point A, located at the rear axle, this center of rotation R being aligned with the axis 34 passing through the rear axle. This axis 34 is perpendicular to the axis 33 of the trailer, which makes it possible to define the point R clearly.

This center of rotation R makes it possible to determine the line along which the thrust exerted by the tractor needs ideally to be applied to the point B at which the trailer is articulated to the tractor. This thrust needs ideally to be exerted along a line 37 which is perpendicular to the straight line 36 connecting the center of rotation R to the point of articulation B.

Thus, in step 32, it is possible to determine the value of the angle $\theta_c$ corresponding to the ideal angle that the axis of the tractor 38 needs to adopt with respect to the axis of the trailer 33. In numerical terms, and by applying basic geometric principles, this setpoint angle has the value $$\theta_c = \tan^{-1}\left(\frac{AB}{\frac{y_c}{2} + \frac{x_c^2}{2y_c}}\right),$$

where $x_c$, $y_c$ are the coordinates of the target point C in the frame of reference mentioned earlier.

An angle sensor 31 positioned at the articulation point B can be used to measure the actual measured angle $\theta$ between the axis 33 of the trailer and that 38 of the tractor.

According to the invention, the feedback control used to calculate the steering angle setpoint value takes account of several components that can be combined.

Figure 6:
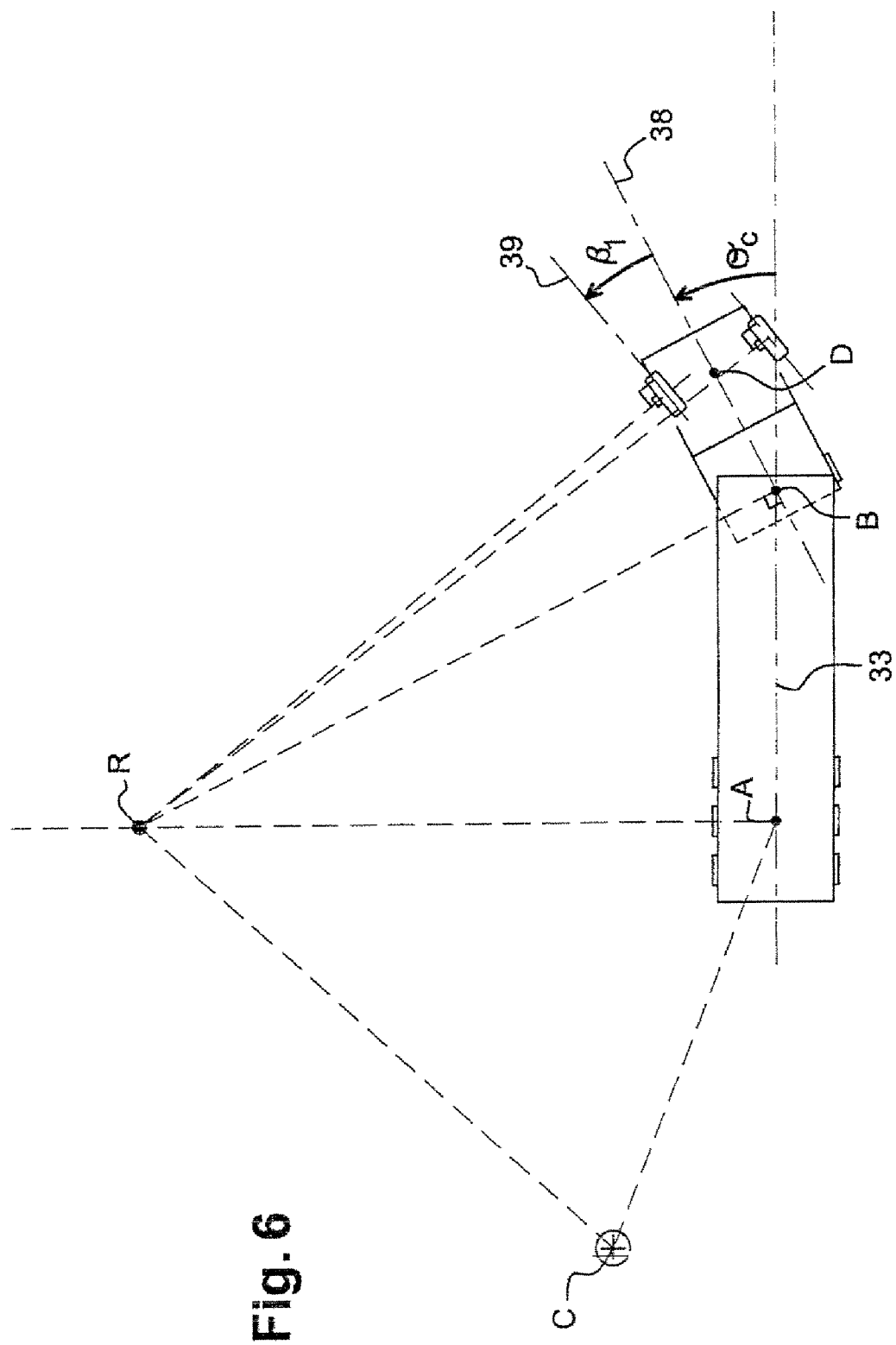
FIG. 6 is a view similar to FIG. 5, showing the truck in a particular configuration.

A first component can be calculated, in step 35, from the position of the point of rotation R combined with the geometry of the vehicle and more specifically of the tractor. This first component $\beta_1$ is aimed at directing the steered wheels optimally when the angle between the axis 38 of the tractor and the axis 33 of the trailer reaches the abovementioned setpoint angle value for $\theta_c$. This configuration, which is illustrated in FIG. 6, is such that the planes 39 of the wheels are substantially tangential to circles of center R. This first component $\beta_1$ is therefore dominant when the tractor and the trailer are at an angle to one another that is close to the value $\theta_c$, and therefore in particular toward the end of the maneuver.

By taking account of approximations regarding the parallelism of the steered wheels, the first component $\beta_1$ can be calculated as follows:

$$\beta_1 = \tan^{-1}\left(\frac{DB}{RB}\right),$$

in which BD is the distance separating the point of articulation B from the location of the point D situated at the steered axle of the tractor, and RB is the distance separating the ideal point of rotation R from the point B at which the trailer is articulated to the tractor, namely, by applying basic geometric principles, $$RB = \sqrt{\left(\frac{y_c}{2} + \frac{x_c^2}{2y_c}\right)^2 + AB^2}.$$

Calculation of the steering angle setpoint value $\beta_0$ takes account of a second component $\beta_2$ resulting from the difference between the actual angle $\theta$ and the setpoint angle $\theta_c$. The purpose of this second component is to allow the vehicle to attain the path in which the angle between the tractor and the trailer has reached the setpoint value $\theta_c$. This component is therefore predominant at the start of the maneuver when the coupling is in a configuration far removed from the configuration which should ideally lead to the target point and which is illustrated in FIG. 6. The difference $(\theta - \theta_c)$ can be filtered by a PID regulator 40 to give rise to the second component $\beta_2$ used to determine the steering angle setpoint value $\beta_0$ using the following equation:

$$\beta_2 = k_2 \cdot (\theta - \theta_c) + k_3 \cdot \frac{d(\theta - \theta_c)}{dt}.$$

In practice, the coefficient $k_2$ is determined as a function of the combined wheelbase of the trailer and of the tractor. In order to avoid the need to apply opposite lock excessively swiftly, it is necessary for this coefficient not to be too high. However, it needs to be high enough that it allows the vehicle to attain the desired path as quickly as possible. The coefficient $k_3$ for the PID regulator 40 provides a damping function and limits the rate of variation of the steering angle setpoint value $\beta_0$ when the rate of variation of the angle $\theta$ is too great. These coefficients may also be dependent on a possible limitation of the speed of the vehicle, employed when backing up. This is because if the speed is limited, the risks of jack-knifing are lower, and it is then possible to use higher coefficients for the PID 40, giving rise to a more responsive correction.

This second component $\beta_2$ is added to the first component $\beta_1$ in the summer 41. These two components $\beta_1$, $\beta_2$ are important for determining a setpoint value that will make it possible to reach the target point as quickly as possible.

Furthermore, to prevent the truck from jack-knifing if the angle $\theta$ becomes too great, a third component $\beta_3$ is calculated. This component is taken into consideration at 47 only when the angle $\theta$ exceeds a predetermined value $\theta_0$ beyond which this risk exists. When this risk is present, this component $\beta_3$ takes dominance over the first $\beta_1$ and second $\beta_2$ components mentioned hereinabove. This is because its prime objective is to prevent the tractor from striking the trailer, by injecting an opposite lock component into the steering angle setpoint value $\beta_0$, the purpose of this opposite lock component being quickly to oppose the excessive increase in the angle $\theta$, in terms of absolute value. It will, however, be noted that this third component is an optional aspect of the invention insofar as its purpose is automatically to monitor the onset of potential jack-knifing situations, which monitoring could be performed by the driver himself. In other words, the invention covers alternative forms of embodiment in which this third component is not calculated.

This third component $\beta_3$, following filtering by a PID controller 48, is subtracted from the sum of the other two components $\beta_1$, $\beta_2$ to give the steering angle setpoint value $\beta_0$.

Thereafter, this sum $\beta_0$ is saturated at 49 to prevent the maximum steering angle $\beta_{max}$ authorized by the steering system from being exceeded. The angle $\beta_0$ thus obtained can be used as a steering angle setpoint value. This setpoint value can be used for various purposes, and in particular by a device controlling an actuator 51 responsible for varying the steering angle in an electrical steering system of so-called "steer by wire" type. This setpoint value can also be communicated to the driver through a screen 52 to assist him with his driving, with a conventional steering system employing a steering column. This setpoint value can also be used in various methods monitoring the behavior of the vehicle, or the like.

It is evident from the foregoing that the method according to the invention makes it easier to perform the operations of backing up an articulated vehicle in which rear visibility is non-existent, and the maneuvering of which is a complicated matter.

The invention claimed is:

1. A method of determining a steering setpoint angle ($\beta_0$) for the steered wheels of a vehicle (1) comprising a tractor (2) and a trailer (8) that is articulated with respect to the tractor (2) during backing-up maneuvers, wherein:

- a setpoint angle value ($\theta_C$) is determined for the angle between the axes of the trailer (33) and of the tractor (38) using a target point (C) through which the path of the vehicle is to pass and as a function of said target point (C);
- the steering angle setpoint value ($\beta_0$) for the steered wheels is determined as the result of feedback control that causes the measured angle ($\theta$) between the axis of the trailer and of the tractor to tend toward said angle setpoint value ($\theta_C$); and
- the value of the setpoint angle ($\theta_C$) between the axes of the trailer (33) and of the tractor (38) is determined as a function of the geometry of the vehicle, said geometry comprising a dimension that is taken in the lengthwise direction of the vehicle.

2. The method as recited in claim 1, wherein the selected target point (C) lies at a predetermined distance ($x_C$) from the rear of the trailer.

3. The method as recited in claim 1, wherein the steering angle setpoint value ($\beta_0$) for the steered wheels includes a component ($\beta_1$) which is a function of the radius of curvature of the path of the point (B) at which the trailer (8) is articulated to the tractor (2).

4. The method as recited in claim 1, wherein the radius of curvature is calculated with respect to a point of rotation (R) situated on the line (34) of the rear axle of the vehicle and equidistant from the target point (C) and from the middle (A) of said rear axle.

5. The method as recited in claim 1, wherein the steering angle setpoint value ($\beta_0$) for the steered wheels includes a component ($\beta_2$) that is a function of the difference between the measured angle ($\theta$) between the axes of the tractor (38) and of the trailer (33), and said setpoint angle ($\theta_C$).

6. The method as recited in claim 5, wherein the component ($\beta_2$) is the result of a proportional, integral, derivative processing of the difference between the measured angle ($\theta$) between the axes of the tractor (38) and of the trailer (33) and said setpoint angle ($\theta_C$).

7. The method as recited in claim 1, wherein the steering angle setpoint value ($\beta_0$) for the steered wheels includes a component ($\beta_3$) taken into account when the angle ($\theta$) between the axes of the tractor and of the trailer crosses a predetermined threshold ($\theta_0$) and which is intended to reduce said angle ($\theta$).

8. The method as recited in claim 1, wherein the dimension that is taken in the lengthwise direction of the vehicle is the distance from a point (B) where the trailer is articulated with respect to the tractor to a point (A) that is aligned, as seen from above, with a rear axle of the trailer.

9. The method as recited in claim 1, wherein the trailer has a plurality of rear axles and the dimension that is taken in the lengthwise direction of the vehicle is the distance from a point (B) where the trailer is articulated with respect to the tractor to a point (A) that is located midway between the rear axles of the trailer.

10. The method as recited in claim 1, wherein the setpoint angle value ($\theta_C$) between the axes of the trailer (33) and the tractor (38) is calculated so that the thrust exerted by the tractor is along a first line (37) which is perpendicular to a second line (36) that connects a center of rotation (R) to a first point (B) where the trailer is articulated with respect to the tractor, with the center of rotation (R) being situated at equal distances from the target point (C) and a second point (A) that is aligned, as seen from above, with a fixed rear axle of the vehicle or, when the vehicle has multiple fixed rear axles, that is situated midway between the rear axles, the distance from the center of rotation (R) to the second point (A) being taken perpendicular to the longitudinal axis (33) of the trailer.

* * * * *